United States Patent [19]

Kamiya

[11] 4,363,375
[45] Dec. 14, 1982

[54] MOTORCYCLE

[75] Inventor: Tadashi Kamiya, Niiza, Japan

[73] Assignee: Honda Giken Kogyo Kabushiki Kaisha, Tokyo, Japan

[21] Appl. No.: 152,101

[22] Filed: May 21, 1980

[30] Foreign Application Priority Data

May 26, 1979 [JP] Japan .................. 54/65235

[51] Int. Cl.$^3$ ............................................. B62K 11/04
[52] U.S. Cl. .................................... 180/227; 280/284
[58] Field of Search ............... 180/219, 225, 226, 227, 180/228, 229, 231; 280/281 R, 283, 284; 180/312, 230

[56] References Cited

U.S. PATENT DOCUMENTS

| | | | |
|---|---|---|---|
| 1,398,024 | 11/1921 | Jacobs | 180/312 |
| 1,479,738 | 1/1924 | Pullin | 180/225 |
| 1,547,157 | 7/1925 | Neracher | 180/225 |
| 4,010,812 | 3/1977 | Bothwell | 180/227 |

FOREIGN PATENT DOCUMENTS

| | | | |
|---|---|---|---|
| 950982 | 9/1956 | Fed. Rep. of Germany | 280/281 R |
| 138714 | 2/1920 | United Kingdom | 180/229 |
| 1247180 | 9/1971 | United Kingdom | 280/281 R |

*Primary Examiner*—Joseph F. Peters, Jr.
*Assistant Examiner*—Ross Weaver
*Attorney, Agent, or Firm*—Armstrong, Nikaido, Marmelstein & Kubovcik

[57] ABSTRACT

A shell structure adapted to accommodate a propelling power unit forms part of a vehicle frame. It is made of a thin sheet, and has no practical strength but is sufficiently reinforced with its opposite side sections firmly secured to the adjacent sides of the power unit. An air path is defined in the shell structure at least between the bottom section thereof and the power unit and, extending between an air inlet and an air outlet opening formed respectively in the front and rear faces of the shell structure, is utilizable to accommodate an exhaust duct. Use of such shell structure enables substantial reduction in vehicle weight and particularly simplifies assembling and maintenance operations of the vehicle.

9 Claims, 11 Drawing Figures

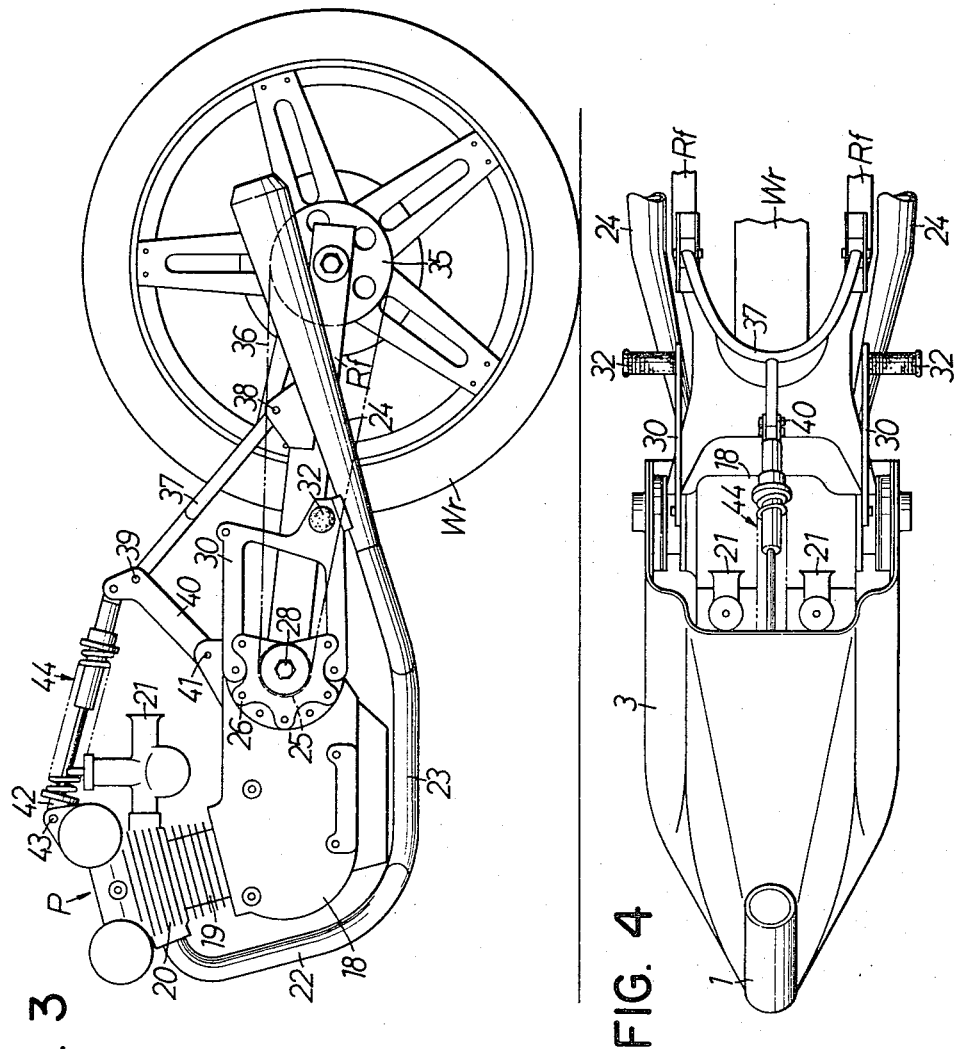
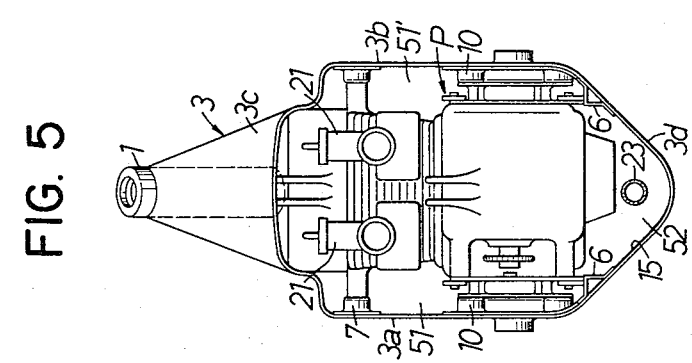

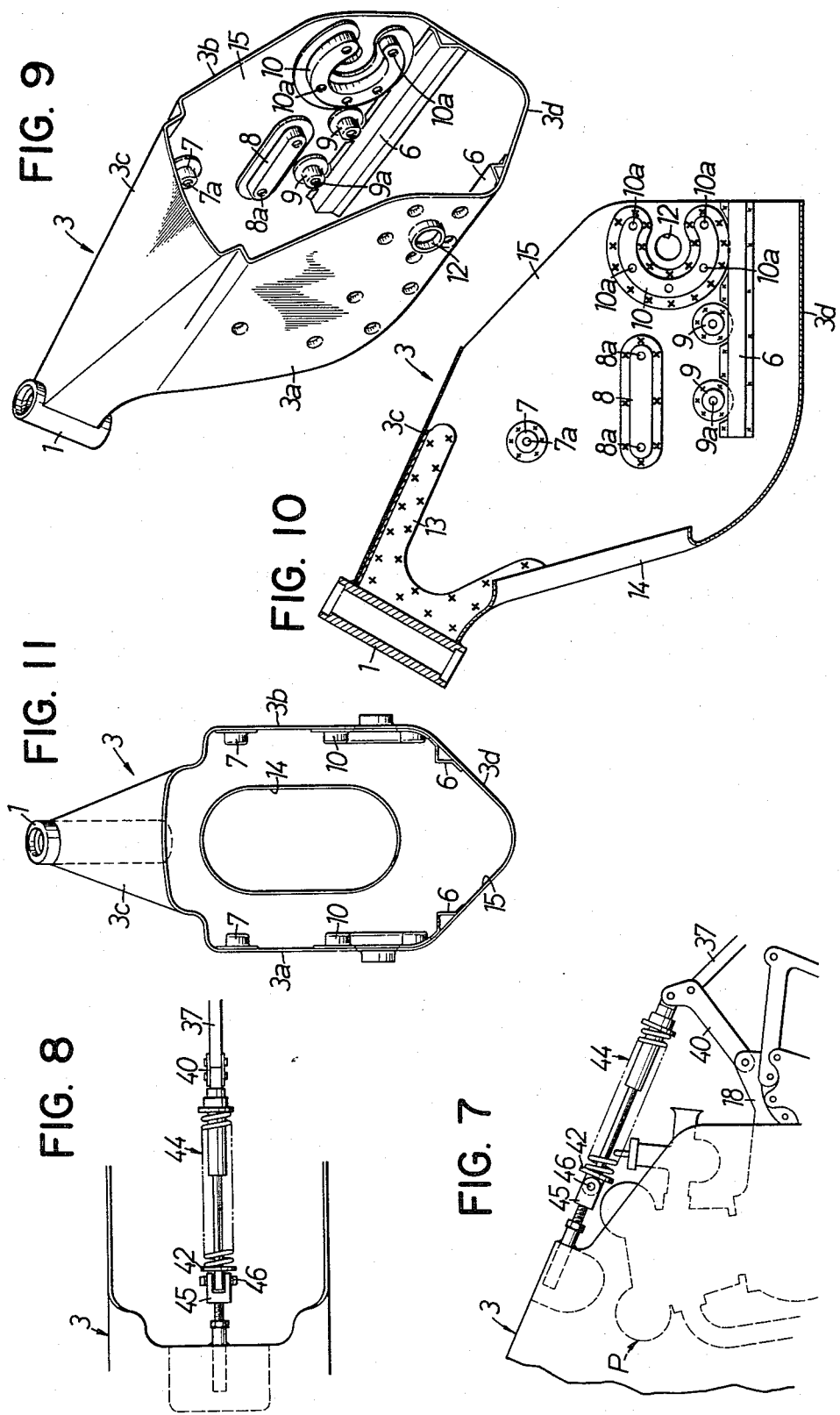

MOTORCYCLE

BACKGROUND OF THE INVENTION

1. Field of the Invention:

This invention relates to motorcycles and more particularly to two-wheeled motorcycles of the type including a shell structure which, forming at least a portion of the vehicle frame, is designed to cover the propelling power unit of the vehicle.

2. Description of the Prior Art:

Generally, with two-wheeled motorcycles, many attempts have previously been made to reduce the vehicle weight as any slight difference in vehicle weight has a great influence upon the various vehicle performances such as acceleration and maneuverability. However, with the conventional motorcycle construction, including a vehicle frame formed of steel tubing or steel sheet, so as to exhibit practically sufficient strength by itself and a power unit mounted on such vehicle frame, it may safely be said that reduction in vehicle weight has already nearly reached its limit.

SUMMARY OF THE INVENTION

Under the circumstances, the present invention has for its primary object to provide a novel form of two-wheeled motorcycle of simplified construction which is designed so that the vehicle weight may be widely reduced compared with that of previous vehicle forms, and the power unit be encased without requiring any special covering member therefor.

The two-wheeled motorcycle of the present invention has the feature that at least a portion of the vehicle frame with a head pipe disposed at the front end thereof to support a front wheel steering shaft is formed by a shell structure made of thin sheet and having no practical strength by itself. A rear wheel driving power unit is accommodated in the shell structure and serves as a reinforcing or stiffening member therefor with the right and left side sections of the shell structure firmly connected with each other through the intermediary of the power unit interposed therebetween.

The above and other objects, features and advantages of the present invention will become apparent from the following description when taken in conjunction with the accompanying drawings.

BRIEF DESCRIPTION OF THE DRAWINGS

In the drawings, which illustrate a preferred embodiment of the present invention:

FIG. 3 is a side elevation of the power unit and rear fork assembly including a fork-mounted rear wheel;

FIGS. 4 and 5 are views taken along the respective lines IV—IV and V—V in FIG. 2, looking in the direction of the arrows;

FIGS. 7 and 8 are side elevational and plan views illustrating a modification of the shock absorber mounting structure in relation to the shell and power unit assembly;

FIG. 9 is an oblique view of the shell structure;

FIG. 10 is a side elevational view, in longitudinal cross section, of the shell structure; and FIG. 11 is a rear view of the shell structure.

DESCRIPTION OF THE PREFERRED EMBODIMENT

Figure 1:
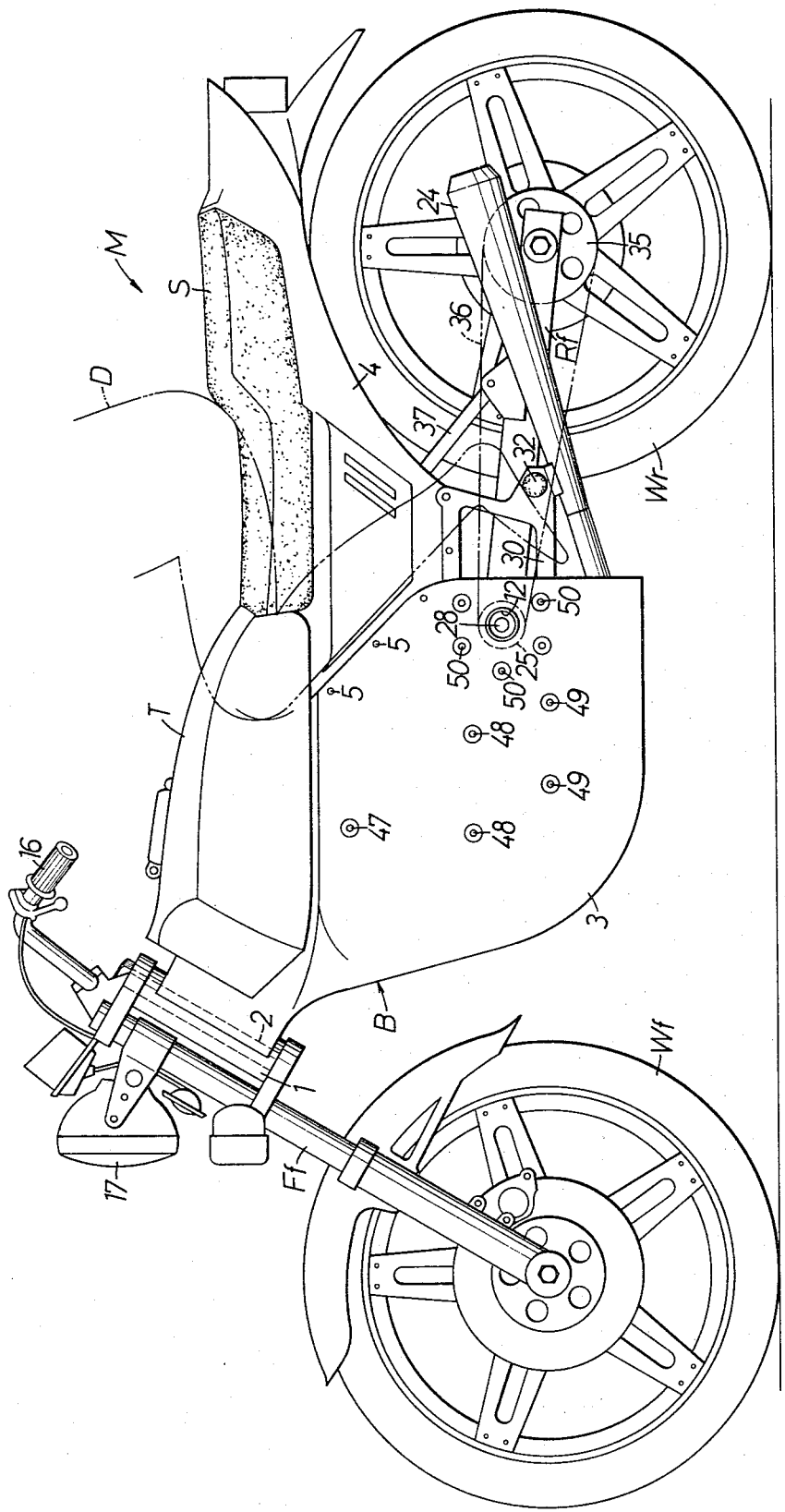
FIG. 1 is a general side elevation of the two-wheeled motorcycle.
Figure 2:
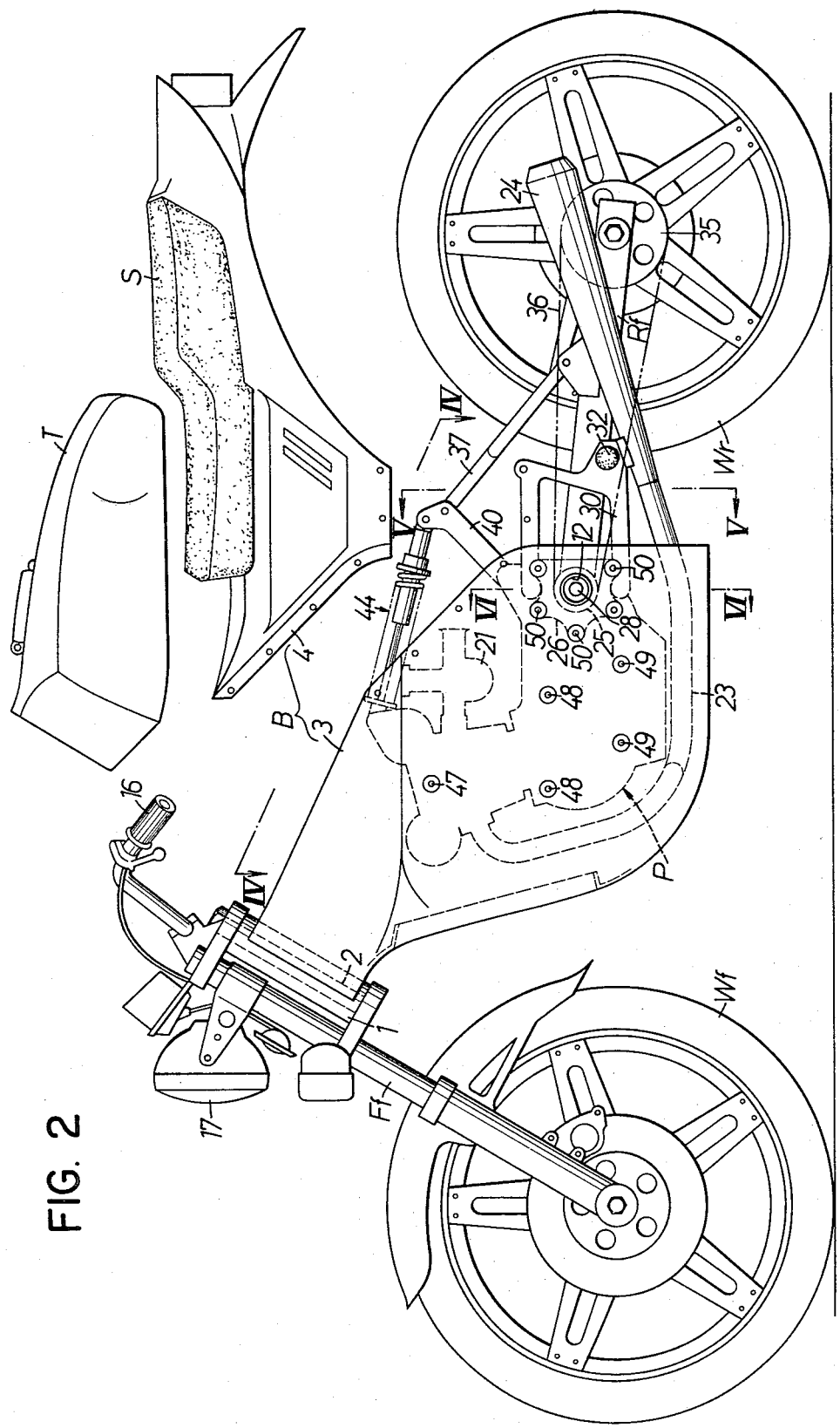
FIG. 2 is a view similar to FIG. 1, of the same with the fuel tank and seat stay assembly shown detached from the vehicle frame.

Referring to the drawings and first to FIGS. 1 and 2, the two-wheel motorcycle illustrated by M has a vehicle frame B with a head pipe 1 disposed at the front end thereof, a front fork $F_f$ mounted on the head pipe 1 through the intermediary of a steering shaft 2 to support a front wheel $W_f$, a rear-wheel driving power unit P accommodated in the vehicle frame B, and a rear fork $R_f$ pivotally connected to the power unit P to support a rear wheel Wr. Description will be made below of the arrangement and construction of these vehicle components in order.

First, the vehicle frame B comprises a shell structure 3 of thin sheet material firmly secured at the front end to the head pipe 1 and extending rearwardly downward therefrom and a seat stay 4, of channel cross section, detachably connected to the rear end of the shell structure 3 by screw means 5 and covering the top portion of rear wheel Wr. The shell structure 3 includes a left and a right side section 3a and 3b, a roof section 3c interconnecting the side sections at their top, and a bottom section 3d interconnecting the side sections at their bottom. Further, the shell structure is formed in its front and rear faces, respectively, with an air inlet opening 14 and an air outlet opening 15, and is as a whole streamlined in shape.

As clearly seen in FIGS. 9 and 10, a pair of guide rails 6 and a plurality of pairs of reinforcing and power unit supporting bosses 7 and 10 are fixed to the inside of left and right side sections 3a and 3b of shell structure 3 as by welding in face-to-face relation to the adjacent sides of power unit P. As shown, the guide rails 6 extend horizontally in a front to rear direction and bosses 10, in the rearmost pair, are shaped in a circular arc or are C-shaped, and are axially aligned with the output shaft 11 of the power unit P. The bosses 7 to 10 are formed therein with respective bolt holes 7a to 10a at an appropriate location or locations, as shown, and, among others, the C-shaped bosses 10 are also formed each with a tool window or opening for tool insertion, 12, at its center.

The shell structure 3 described above is formed integral or in appropriately divided form of a lightweight material such as light alloy or synthetic resin and has no practically effective strength by itself. Reference numeral 13 indicates a patch member bonded to the inside surface of the top portion of shell structure 3 for local reinforcement thereof.

Provided on top of the shell structure 3 is a fuel tank T in straddling relation thereto. Mounted on the seat stay 4, which extends rearwardly from the fuel tank, is a seat S for the driver D to sit thereon in a straddling fashion.

The front fork $F_f$ is of telescopic construction with a steering handle 16 and a headlight 17 fitted, respectively, to the top end and to the front face thereof.

Description will next be made of the power unit P.

As best seen in FIG. 3, the power unit P includes a crank-case 18 and a multiple-barrel cylinder block 19 which extends upwardly from the front top of the crankcase and is inclined slightly forward. Connected to the top end of cylinder block 19 is a cylinder head 20 to the rear face of which a plurality of carburetors 21 are secured. Secured to the front face of cylinder head 20 are a plurality of exhaust pipes 22 which are bent to extend downwardly along the front face of the power plant P and jointed under the latter to a common exhaust duct 23. The exhaust duct 23, extending rearwardly along the bottom of the power unit P in the medial plane thereof, is connected with an exhaust muffler 24, which is arranged adjacent to the rear fork $R_f$.

Figure 6:
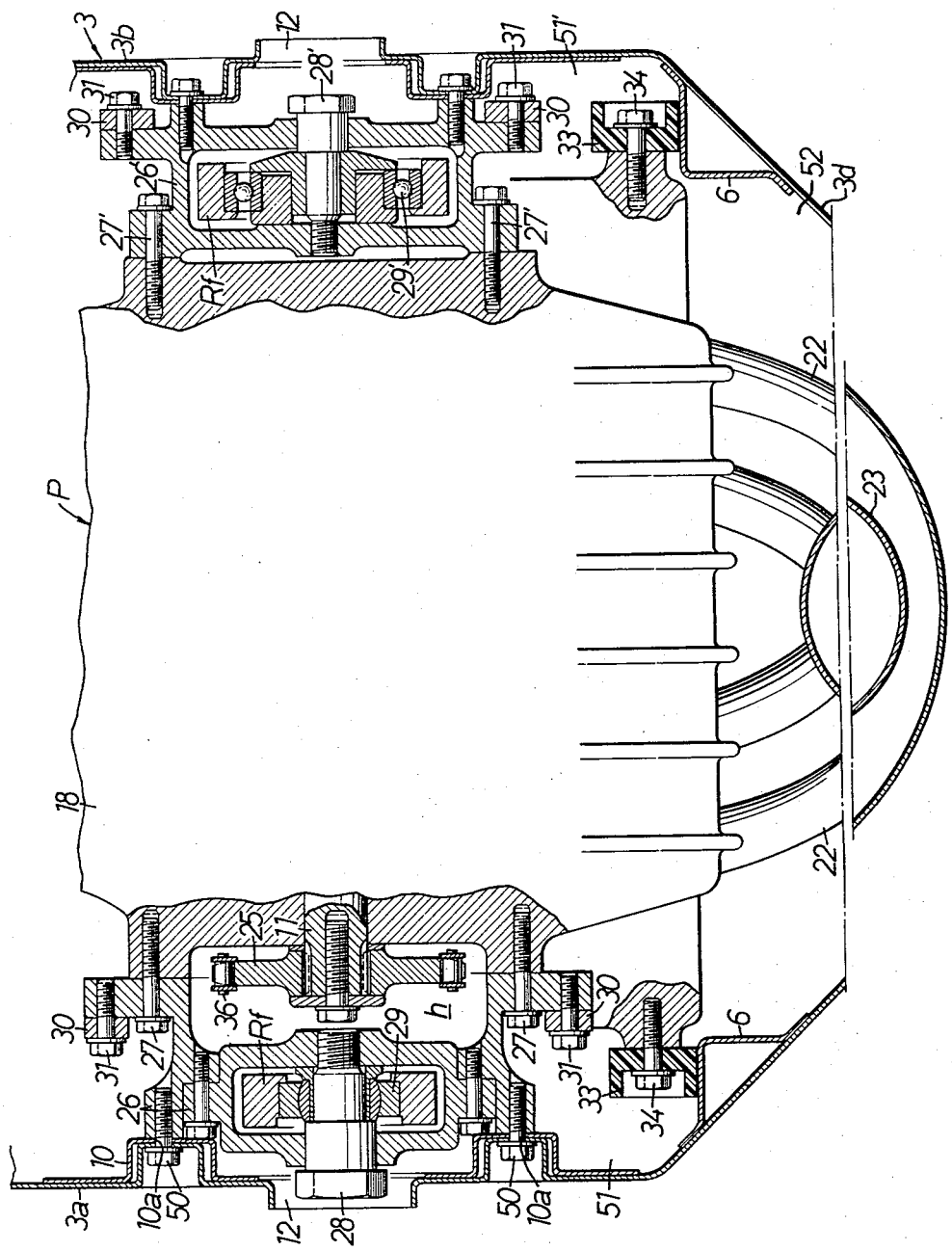
FIG. 6 is an enlarged cross section taken along the line VI—VI in FIG. 2.

As shown in FIG. 6, a driving sprocket wheel 25 is fixedly mounted on the output shaft 11 of power unit P, which extends exteriorly of the crankcase 18 through the left side wall thereof. An adapter 26 is fixed to the left side of the crankcase 18 by bolts 27, substantially covering the front half of the driving sprocket 25. Also, an adapter 26' is fixed to the right side of the crankcase 18 by bolts 27' in a position opposite to the adapter 26. A pair of pivot shafts 28 and 28', arranged axially in alignment with the output shaft 11, are removably threaded in the respective adapters 26 and 26'. The rear fork $R_f$ is pivotally mounted at its right and left front basal ends on the pivot shafts 28 and 28' through the intermediary of respective bearings 29 and 29'.

Further, a pair of parallel brackets 30 are firmly secured to the respective adapters 26 and 26' by bolts 31 and, extending rearwardly therefrom, each serve not only to support a bar-like step member 32, but also the adjacent leg of exhaust muffler 24.

Provided on the right and left sides of the crankcase 18 are a pair of slide members of synthetic resin material, 33, which are secured to the crankcase by bolts 34 and slidable over the respective guide rails 6 on the inside of the shell structure 3.

The rear wheel Wr, rotatably supported on the rear fork $R_f$ at the rear end thereof, has a driven sprocket wheel 35 secured coaxially thereto and a drive chain 36 is trained under tension between the driving and driven sprocket wheels 25 and 35, as shown. With this arrangement, the output of power unit P is transmitted from the output shaft 11 through the driving sprocket 25 and chain 36 to the driven sprocket 35 to drive the rear wheel Wr.

In order to prevent any unusual strain occurring in the area of pivotal connection of rear fork $R_f$ even with more or less deformation of the left leg of rear fork $R_f$ under the tension of drive chain 36, the bearing 29 on the pivot shaft 28, which lies adjacent to the output shaft 11 of power unit P, takes the form of a spherical bearing, as illustrated, so that smooth up and down rocking movement of the rear fork $R_f$ is ensured.

Further, since the output shaft 11 and pivot shafts 28 and 28' are arranged in axial alignment with each other, as described above, the distance between the driving and driven sprockets 25 and 35 and hence the tension of the drive chain 36 remain unchanged at all times irrespective of the vertical position of the rear fork $R_f$ in its rocking movement.

As shown in FIGS. 3 and 4, a compression link 37 is pivotally supported 38 at its basal, rear end by the rear fork $R_f$ in straddling relation to the rear wheel Wr for free vertical rocking movement. The link 37 is pivotally connected at its distal end with the distal end of a rocker link 40 as indicated at 39. The rocker link 40 is pivotally supported at its basal end on the top of crankcase 18 for fore and aft rocking movement. Arranged between the rocker link 40 and a mounting member 42, which is pivoted to the cylinder head 20 as at 43 for vertical rocking movement, is a shock absorber 44 fitted with a suspension spring, as shown. It will be noted that the suspension spring and shock absorber assembly 44 so arranged serves as an effective means for cushioning the rear fork $R_f$ in its vertical rocking movement during vehicle travel.

In the manner described above, the vehicle components, including the power unit P, rear wheel Wr, and the system of power transmission therebetween, are put together into a single assembly to be detachably fitted to the vehicle frame B and more particularly to the shell structure 3 and this enables the two-wheeled motorcycle to be assembled with particular ease and efficiency.

FIGS. 7 and 8 illustrate a modification of the mounting member 42 for shock absorber 44, which takes the form of an adjustable support rod 45 threaded into the top of shell structure 3 and formed with a bifurcated head for pivotal connection 46 with the shock absorber.

To fit the assembly of FIGS. 3 to 5 to the vehicle frame B, the power unit P is inserted into the shell structure 3 through the air outlet opening 15 formed in its rear end face by placing the slide members 33 in sliding engagement with the respective guide rails 6 until it is set in a predetermined position in the shell structure. Subsequently, the bosses 7 to 10 on the opposite side sections 3a and 3b of the shell structure 3 are firmly fixed to the power unit P by means of fastening bolts 47 to 50, which are inserted into respective bolt holes 7a to 10a from outside of the shell structure 3. Among others, the C-shaped bosses 10 are clamped against the respective adapters 26 and 26' on the opposite sides of the power unit P with the result that the side sections 3a and 3b of the shell structure 3 are firmly secured to the power unit P particularly around the pivot shafts 28 and 28', on which the rear fork $R_f$ is mounted. In this manner, the power unit P serves solidly to interconnect the opposite side shell sections 3a and 3b, thus acting as a reinforcing or stiffening member effective to impart a substantial practical strength to the shell structure 3.

Further, in the power unit and shell assembly, there are formed air passages 51, 51' and 52 between the power unit P and the left side section 3a, right side section 3b and bottom section 3d of the shell structure 3, respectively, which place the air inlet and outlet openings 14 and 15 in fluid communication with each other. The exhaust collecting duct 23 is positioned in the bottom air passage 52. During travel of the vehicle, it will be apparent that air flows into the shell structure 3 through the air inlet opening 14 formed at the front end thereof and, passing through the air passages 51, 51' and 52, acts to cool the power unit P and exhaust duct 23 in an efficient manner, finally flowing out of the shell structure through the air outlet opening 15.

In the normal riding position of the driver D, in which his feet are positioned on the steps 32 with the fuel tank T held between his knees, as seen in FIG. 1, his legs are both held concealed behind the shell structure 3. This, together with the streamline configuration of the latter, contributes much to reduction in air resistance of the vehicle during travel.

In the state of the power unit P fitted to the shell structure 3, when it is desired to separate the rear fork $R_f$ from the power unit P for maintenance work such as renewal of the drive chain 36, it is only required that an appropriate tool is inserted through the right and left tool windows 12 into the shell structure 3 in order to draw the pivot shafts 28 and 28' out of the respective bearing 29 and 29', to disconnect thereby the rear fork $R_f$ at its basal ends from the adapters 26 and 26'. There is no need for removing the power unit P once fitted to the shell structure 3 therefrom. This enables the maintenance operation to be performed with particular ease and efficiency.

To summarize, according to the present invention, at least a portion of the vehicle frame carrying a head pipe is formed of a shell structure made of thin sheet and having no practical strength by itself, and in which structure a rear wheel driving power unit is accommodated. The right and left side sections of the shell structure are firmly secured to each other through the intermediary of the power unit interposed therebetween. In this assembly, the power unit serves as a stiffening member for the shell structure, in effect imparting thereto a practical strength required so that the weight of the vehicle frame and hence that of the vehicle as a whole can be widely reduced. As a result, a two-wheeled motorcycle can be realized which is highly improved in acceleration, maneuverability, fuel consumption and other performances and which is particularly valuable as a motorcycle for racing use. In addition, the shell structure forming a portion of the vehicle frame serves the function of protecting the power unit while serving as a decorative covering therefor. It is to be appreciated that use of such shell structure, forming part of the vehicle frame, is highly effective to simplify the construction of a two-wheeled motorcycle.

Though one preferred embodiment of the invention has been shown and described, it will be apparent to those skilled in the art that it is not limited to the details set forth but is of the full scope of the appended claims.

What is claimed is:

1. A two-wheeled motorcycle comprising:
a vehicle frame in the form of shell structure of thin sheet material having a pair of opposed side sections and a head pipe at the front end thereof to support a front wheel steering shaft;
a rear wheel driving power unit accommodated in and interconnected with said opposite side sections of said shell structure for increased rigidity of latter;
guide rail means disposed on the inside surfaces of said opposed side sections of said shell structure and extending longitudinally in a horizontal direction;
a pair of slide members provided on each side of said power unit and adapted to be slidably engaged with said guide rail members for setting said power unit at a predetermined position in said shell structure; and
power unit supporting members provided on said opposed side sections of said shell structure so as to be firmly fixed to opposite sides of said power unit, said supporting members including mounting bosses integrally formed in said shell structure in axial alignment with an output shaft of said power unit, said bosses each having a tool insertion window for tool insertion therethrough.

2. A two-wheeled motorcycle as set forth in claim 1, wherein said slide members are made of synthetic resin and secured to a crankcase of said power unit by fixing means.

3. A two-wheeled motorcycle as set forth in claim 1, wherein said supporting members are formed at the appropriate location thereof with holes for inserting fastening bolts therethrough.

4. A two-wheeled motorcycle as set forth in claim 1, wherein said bosses are of circular shape.

5. A two-wheeled motorcycle as set forth in claim 1, further comprising a pair of adapters fixedly arranged on the opposite sides of said power unit, said mounting bosses being clamped against said respective adapters.

6. A two-wheeled motorcycle as set forth in claim 1, wherein said shell structure has an air inlet and air outlet openings respectively formed in the front and rear faces thereof to define an air path between the inside surface of said shell structure and said power unit, a single exhaust duct held in communication with a plurality of exhaust pipes being arranged in said air path between the bottom of said shell structure and said power unit.

7. A two-wheeled motorcycle as set forth in claim 1, wherein said shell structure has an air inlet and air outlet openings respectively formed in the front and rear faces thereof to define an air path between the inside surface of said shell structure and said power unit, said power unit being inserted into said shell structure through said air outlet opening, and wherein a rear wheel supporting fork is pivotally connected to said power unit to form a power unit and rear fork assembly, the pivotal connection of said rear fork with said power unit being surrounded with said shell structure.

8. A two-wheeled motorcycle as set forth in claim 7, wherein the output shaft of said power unit and pivotal shaft of said rear fork are arranged axially in substantial alignment with each other.

9. A two-wheeled motorcycle as set forth in claim 7, wherein said shell structure further comprises a roof section for interconnecting each of said opposed side sections, said roof section being provided at the rear end thereof with a supporting rod which carries a shock absorber between itself and said rear fork.

* * * * *